US010512996B2

(12) United States Patent
Haenschke et al.

(10) Patent No.: US 10,512,996 B2
(45) Date of Patent: Dec. 24, 2019

(54) GANTRY LOADER WITH GRIPPER AND ENERGY STORE

(71) Applicant: Liebherr-Verzahntechnik GmbH, Kempten (DE)

(72) Inventors: David Haenschke, Altusreid (DE); Christof Porsche, Kaufbeuren (DE); Thomas Mattern, Rieden (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 16/022,469

(22) Filed: Jun. 28, 2018

(65) Prior Publication Data

US 2018/0318974 A1 Nov. 8, 2018

Related U.S. Application Data

(63) Continuation-in-part of application No. 15/973,093, filed on May 7, 2018, now abandoned.

(30) Foreign Application Priority Data

May 8, 2017 (DE) .................. 10 2017 109 818

(51) Int. Cl.
| | |
|---|---|
| B23Q 7/04 | (2006.01) |
| B60L 5/00 | (2006.01) |
| B23Q 7/14 | (2006.01) |
| B25J 5/02 | (2006.01) |
| B23Q 5/38 | (2006.01) |
| B23Q 5/28 | (2006.01) |
| B25J 9/02 | (2006.01) |
| B25J 19/00 | (2006.01) |
| B65G 47/90 | (2006.01) |

(52) U.S. Cl.
CPC ............. *B23Q 7/046* (2013.01); *B23Q 5/28* (2013.01); *B23Q 5/385* (2013.01); *B23Q 7/048* (2013.01); *B23Q 7/1494* (2013.01); *B25J 5/02* (2013.01); *B25J 9/026* (2013.01); *B25J 19/005* (2013.01); *B25J 19/0045* (2013.01); *B60L 5/005* (2013.01); *B65G 47/901* (2013.01); *B65G 47/907* (2013.01)

(58) Field of Classification Search
CPC ........................................ B60L 5/005
See application file for complete search history.

(56) References Cited

U.S. PATENT DOCUMENTS 3,880,299 A * 4/1975 Zollinger ............... G06Q 10/08
                                                         414/273
5,788,033 A * 8/1998 Lucking .................. B60M 1/12
                                                         191/1 R
(Continued)

FOREIGN PATENT DOCUMENTS

DE       3834918 A1    7/1989
DE     19842738 A1    4/2000
(Continued)

*Primary Examiner* — Gerald McClain
(74) *Attorney, Agent, or Firm* — McCoy Russell LLP (57) ABSTRACT

A gantry loader having at least one carriage travelable at a horizontal guide rail, in particular for the transport of workpieces between stations of a production system, wherein the carriage has at least one drive. The present energy is characterized in that the carriage has an energy store for the at least partial energy supply of the drive.

18 Claims, 5 Drawing Sheets

(56) References Cited

U.S. PATENT DOCUMENTS

| | | | |
|---|---|---|---|
| 8,061,495 B2* | 11/2011 | Ichimura | B60L 5/005 |
| | | | 104/98 |
| 8,347,789 B2 | 1/2013 | Wolf et al. | |
| 8,499,911 B2* | 8/2013 | Ichimura | B66C 13/12 |
| | | | 191/12 R |
| 9,422,121 B2* | 8/2016 | Staunton | H01L 21/67709 |
| 9,616,538 B2 | 4/2017 | Lingenhöl et al. | |
| 2008/0048497 A1* | 2/2008 | Donnelly | B66C 13/18 |
| | | | 307/19 |
| 2013/0228398 A1* | 9/2013 | Voelz | F01M 7/00 |
| | | | 184/6 |

FOREIGN PATENT DOCUMENTS

| | | | | |
|---|---|---|---|---|
| DE | 102006049588 A1 | 8/2007 | | |
| DE | 102012011534 A1 | 12/2013 | | |
| DE | 102013014266 A1 | 3/2015 | | |
| DE | 102014014874 A1 | 4/2016 | | |
| EP | 2755100 A1 * | 7/2014 | | B60M 7/003 |
| EP | 2755100 A1 | 7/2014 | | |
| GB | 1438301 A | 6/1976 | | |
| JP | 2011109859 A | 6/2011 | | |
| WO | 2015132379 A1 | 9/2015 | | |

\* cited by examiner

GANTRY LOADER WITH GRIPPER AND ENERGY STORE

CROSS REFERENCE TO RELATED APPLICATIONS

The present application is a continuation-in-part of U.S. Non-Provisional patent application Ser. No. 15/973,093, entitled "Gantry Loader", and filed on May 7, 2018. U.S. Non-Provisional patent application Ser. No. 15/973,093 claims priority to German Patent Application No. 10 2017 109 818.6, entitled "Gantry Loader", and filed on May 8, 2017. The entire contents of the above-listed applications are hereby incorporated by reference for all purposes.

TECHNICAL FIELD

The present disclosure relates to a gantry loader having at least one carriage travelable at a horizontal guide rail. Such gantry loaders in particular serve the transport of workpieces between stations of a manufacturing system such as manufacturing machines and/or feed and/or removal devices. Such gantry loaders are sometimes also called gantry robots or overhead transfer devices.

BACKGROUND AND SUMMARY

In the mass production of workpieces, in particular in the mechanical manufacture of workpieces, the workpieces are successively fed to a plurality of machine tools in accordance with an exactly planned production routine. For this purpose, the workpieces are first channeled into the production system via a feed device and are then transported onward from one manufacturing machine to the next within the production system. Depending on the number of production operations, the workpieces are either channeled out of the production system via a removal device or are transferred via an automation buffer system to a further production system. The transport of the workpieces from one station of the production system to the next can take place via a gantry loader. A plurality of gantry loaders can also work in parallel or in series in the production system. A plurality of carriages can furthermore be provided at the gantry loader.

Gantry loaders typically work in a fully automated manner, with the control of the carriages taking place via stationary, centrally arranged controls that coordinate the operation of the carriages with the operation of the manufacturing machines and of the feed and/or removal device.

Such gantry loaders are known, for example, from DE 10 2012 011 534 A1, DE 10 2013 014 266 A1, and DE 10 2014 014 874 A1. Gantry loaders from the prior art have a supply chain comprising corresponding supply lines for supplying the carriage or carriages with energy and lubricants and for the data transfer with the carriage. Supply chains are, however, exposed to substantial wear due to the movement of the carriage. A subsequent extension of the gantry loader is furthermore only possible with a complete replacement of the supply chain. There is additionally a safety risk since the supply chain can fall off its support surface.

A transport system is known from DE 10 2006 049 588 A1 having a rail system and carriages movably arranged thereon, wherein the rails comprise a primary guidance system to which at least one secondary coil encompassed by the carriage is inductively coupled for a contactless transmission of electrical power and/or of information. A supply chain should hereby be dispensed with since the energy supply or the communication with the carriage takes place contactlessly. The implementation of the teaching known from DE 10 2006 049 588 A1 is, however, associated with considerable problems since the contactless transmission of high electrical powers such as is required for the operation of a carriage is associated with great difficulties.

It is therefore the object of the present disclosure to provide an improved gantry loader.

This object is achieved by a gantry loader in accordance with claim 1. Embodiments of the present disclosure form the subject of the dependent claims.

The present disclosure comprises a gantry loader having at least one carriage travelable at a horizontal guide rail, wherein the carriage has at least one drive. Provision is made in accordance with the present disclosure that the carriage has an energy store for an at least partial energy supply of the drive. Substantial advantages with respect to the configuration of the energy supply and the operation of the gantry loader result through the energy store.

The gantry loader in accordance with the present disclosure can in particular serve the transport of workpieces between stations of a manufacturing system such as manufacturing machines and/or feed and/or removal devices. It can here in particular be used for the purposes that have been described in more detail above with respect to the conventional art.

In one embodiment, the drive of the present disclosure is an electric drive. The energy store is an electrical energy store. For example, a capacitor, in particular a supercap, and/or a rechargeable battery can be used as an energy store. The carriage here can have exclusively electrical drives.

The carriage furthermore may also have an energy recovery device for recovering energy from the movement of the carriage and/or from the movement of at least one component of the carriage, with the recovered energy being stored in the energy store. The energy consumption of the gantry loader can hereby be lowered.

The drive may serve the implementation of the energy recovery as a generator, with the energy recovery device having a control that stores the energy generated in the drive in the energy store.

In a first variant, the recovery device permits the recovery of kinetic energy from the deceleration process of the carriage and/or of at least one component of the carriage. A recovery of kinetic energy from the movement of the carriage along the horizontal guide rail can in particular be provided. Since the carriage stops frequently in the course of operation of the gantry loader, the deceleration process required for this purpose can be used for the energy recovery.

In a second variant that can be combined with the first variant, the energy recovery system permits the recovery of potential energy from the movement of a component of the carriage that is movable in at least the vertical direction. The component serves the movement of the workpieces in a vertical direction and/or supports a gripper.

An embodiment of the gantry loader in accordance with the present disclosure serves the loading of the manufacturing machines and/or of the feed and/or removal device of the production line with workpieces from above. For this purpose, the carriage has a component that is at least also movable in a vertical direction and serves the raising or lowering of the workpieces.

In accordance with the above-described second variant, the potential energy of this component and/or of the workpiece can be recovered on the lowering of the component and can be stored in the energy store.

An embodiment of the gantry loader in accordance with the present disclosure can have an energy supply device for supplying the carriage with energy. The energy supply device can serve the charging of the electrical energy store and/or the direct energy supply of the at least one drive of the carriage. The energy supply device may work contactlessly, in particular via inductions.

In a first embodiment variant of the present disclosure, the energy supply device can supply the carriage with energy permanently and/or in any travel position. The energy store in accordance with the present disclosure can serve the support of this energy supply device so that the energy supply device itself can be configured as less powerful.

An energy supply section of the energy recovery device in this variant extends over the total length of the guide rail. The energy supply device can in particular have one or more induction coils that extends or extend in their totality or extend over the total length of the guide rail. The carriage can have an induction consumer that cooperates with the induction coil or coils.

Provision can be made in a second variant of the present disclosure that the energy supply device supplies the carriage with energy at times or in individual travel positions and/or travel sections and does not supply the carriage with energy at other times or in other individual travel positions and/or travel sections. In this case, the energy supply device in particular serves the charging of the energy store.

In this variant, the energy supply device can have a plurality of energy supply sections that are arranged at individual travel positions and that extend along individual travel sections, with sections without energy supply being provided between these travel positions and/or travel sections. The energy supply sections are respectively one or more induction coils that further cooperate with an induction consumer of the carriage.

The second variant enables a substantially less expensive configuration of the energy supply device since the latter no longer has to extend over the total length of the guide rail.

In an embodiment, the energy supply device supplies the carriage with energy in at least one working position at which the carriage stops above a station of the manufacturing system such as a manufacturing machine and/or a feed and/or removal device to place a workpiece down or pick it up. An energy supply section, for example an induction coil, via which the carriage arranged in the work position is supplied with energy can in particular be associated with such a work position.

Since the carriage remains at such a work position for some time to place the workpiece down or pick it up, this time can now be used to charge the energy store.

There is furthermore typically a particularly high power consumption of the carriage at just such work positions so that it is of advantage for the configuration if the carriage or one or more drives of the carriage are supplied with energy in such a position both via the energy store and via the energy supply section. The energy transmission power of the energy supply section, but optionally also the storage power of the energy store, can hereby be configured as lower.

Alternatively or additionally, the energy supply device can supply the carriage with energy in at least one parking position. The energy supply device may have at least one energy storage section that is associated with the parking position. The energy supply section can in particular be an induction coil.

An embodiment of the carriage travels into the parking position by a control of the gantry loader and/or of the carriage for charging the energy store. This can take place, for example, in dependence on a charge state of the electrical energy store and/or at predefined times in the charge cycle.

In the parking position, the carriage may be located outside the travel region required for the transport of the workpieces.

In accordance with a first aspect of the present disclosure, the energy store can serve the coverage of consumption peaks. The energy supply device can hereby be dimensioned such that the peak power provided by the energy supply device is beneath the maximum power consumption of the carriage. Such an embodiment is of advantage both when the energy supply device supplies the carriage with energy constantly and/or in every travel position and when the energy supply device primarily supplies the carriage with energy at times and/or at specific travel positions and/or travel sections.

In a second aspect of the present disclosure, the carriage can be operable at least at times solely via the energy of the energy store. This permits the energy supply device to be configured such that the carriage is no longer supplied with energy constantly and/or no longer at every travel position. The carriage therefore becomes independent of the energy supply device at least over a time period thanks to the energy store.

An embodiment of the carriage is operable primarily or exclusively via the energy of the energy store over at least one travel cycle and further over a plurality of travel cycles. A travel cycle comprises a picking up of a workpiece, a horizontal traveling of the carriage, and a placing down of the workpiece.

The energy store can also be configured such that the carriage is operable solely via the energy of the energy store over more than 30 minutes, over more than an hour.

In a possible embodiment of the present disclosure, the energy store is replaceable. The carriage can in particular be configured such that a discharge energy store can be replaced with a charged energy store. The replacement may take place without the carriage having to be mechanically released from the guide rail.

A charging of the energy store via an energy supply device of the gantry loader at the carriage can be dispensed with by the exchange of the energy store in a possible embodiment. Charging apparatus can optionally be completely dispensed with here.

Alternatively, the replaceability can be provided in addition to the rechargeability of the energy store at the carriage.

Embodiments of the gantry loader have a change station for a manual and/or automatic exchange of the energy store. The change station makes possible an access to the carriage for a manual exchange and/or has an automation system that removes the energy store from the carriage and replaces it with another energy store. The change station may have a charging apparatus for charging one or more energy stores. The change station may be arranged in the region of the guide rail and/or can be traveled to by the carriage by traveling along the guide rail into an exchange position.

Embodiments of the control of the carriage and/or of the gantry loader monitors the charge status of the energy store and outputs a display and/or a control signal when the charge status falls below a predefined limit value. An automatic traveling to the change station and/or an automatic replacement of the energy store takes/take place in response to the control signal.

Embodiments of the gantry loader in accordance with the present disclosure comprises a cableless data transmission system for communication with the carriage. The data transmission system can in particular serve the communication with a control and/or with sensors of the carriage. The data transmission system can in particular enable communication between a control of the gantry loader and a control and/or sensors of the carriage.

In a first variant, the data transmission system comprises a slit hollow conductor that extends along the guide rail and cooperates with an antenna arranged at the carriage. The antenna arranged at the carriage may extend into the hollow conductor via the slit.

In a second variant that can be combined with the first variant, the cableless data transmission system permits communication with the carriage in any travel position of the carriage.

Provision is in contrast made in a third variant that the cableless communication system permits communication with the trolley in individual travel positions and/or travel sections and does not permit communication with the trolley in other individual travel positions and/or other travel sections. Such an intermittent data transmission can be sufficient in dependence on the technical control demands.

In this case, communication is possible in a work position in which the carriage stops above a station of the manufacturing system such as a manufacturing machine and/or of the feed and/or removal device to place down or pick up a workpiece and/or in a parking position. Corresponding communication elements may be provided for this purpose at these positions. The third variant can in particular be a point-to-point communication such as industrial Bluetooth.

The gantry loader can also have a plurality of parallel data transmission systems in accordance with one or more of the above-described variants.

The data transmission system or the data transmission systems may furthermore be designed as redundant.

The carriage may have a control for the at least one drive. The power electronics for controlling the drive can in particular be arranged in the carriage.

Embodiments of the control of the carriage receives commands and/or synchronization data for controlling the drive from a control of the gantry loader. Alternatively or additionally, the control can transmit status data of the carriage to a control of the gantry loader.

In a first variant, the regulation of the drive can take place via the control of the gantry loader. In this case, the control of the carriage transmits positional data and/or speed data to the control of the gantry loader that compares them with desired position values and desired speed values and transmits corresponding control commands for controlling the drive to the control of the carriage.

The first variant, in which the regulation of the drive takes place via the control of the gantry loader, is used with a communication system that permits constant communication with the carriage.

In a second variant, the regulation of the drive can take place via the control of the carriage. In this case, the control of the carriage itself evaluates the positional data and/or speed data and compares them with desired values to control the drive accordingly. The control of the gantry loader transmits the desired values to the control of the carriage.

If the regulation of the drive takes place via the control of the carriage, a communication system can also be used that provides intermittent communication with the carriage.

In this case, desired values for the position and/or speed of the component driven by the drive are transmitted via the communication system or such desired values are stored in a store of the control of the carriage so that only synchronization with the remaining elements of the production system has to be maintained via the communication systems.

Embodiments of the gantry loader include all the drives of the carriage being regulated via the control of the carriage or all the drives of the carriage via the control of the gantry loader.

Mixed systems are also conceivable with which the regulation of at least one drive of the carriage takes place via the control of the carriage and the regulation of at least one other drive takes place via the control of the gantry loader.

An embodiment of the carriage has an autonomous lubrication system having a lubricant container for the supply of at least one mechanical axle and/or at least one drive with lubricant. A lubricant supply to the carriage can hereby also be dispensed with.

An embodiment of the drive of the carriage along the guide rail takes place via a drive element of the carriage that meshes with a toothed rack of the guide rail. The position of the carriage at the guide rail is hereby unambiguously determined via the position of the drive element. The drive element can be a pinon or a worm.

The carriage can have a component that is at least also movable in the vertical direction. The component serves the movement of the workpieces in the vertical direction. The component can support a gripper for gripping the workpieces.

The component can have a vertically movable linear axle in a first embodiment. For example, a vertically movable toothed rack can be used that can be traveled vertically via a drive of the carriage. In a second embodiment, a robot arm having a plurality of pivot and/or rotational axles can be used. A 6-axis industrial robot can be arranged at the carriage, for example. A combination of linear axles and pivot and/or rotational axles is furthermore also conceivable.

The gantry in accordance with the present disclosure can be designed as a linear gantry in a first variant and as an area gantry in a second variant.

The guide rail may be supported via one or more supports and may extend above the production machines and/or the feed and/or removal devices of the production system. If it is an area gantry, the supports are stationary, with the guide rail being fixedly arranged at the supports. If it is an area gantry, either the supports are travelable or the guide rail at the supports is travelable.

The gantry loader may be designed such that it grips the workpieces directly or such that it grips pallets and/or workpiece holders that carry the workpieces.

The gantry loader in accordance with the present disclosure can have two or more carriages that are movable along the same guide rail.

Since an energy supply change is no longer required, the gantry loader can be flexibly equipped with a plurality of carriages. A flexible adaptation to varying production routines is hereby in particular possible without any greater construction effort having to be made. The carriages can furthermore also be replaced without problem and without any great effort for servicing purposes.

The design of the gantry loader in accordance with the present disclosure has the further advantage that the gantry loader can be extended without problem to adapt it to a varying production process or to new customer demands. In the design, only the guide rail has to be correspondingly extended for this purpose and optionally the energy supply sections and/or data transmission sections have to be extended or supplemented by new sections.

The present disclosure will now be explained in more detail with reference to embodiments and to drawings.

DETAILED DESCRIPTION

Figure 1:
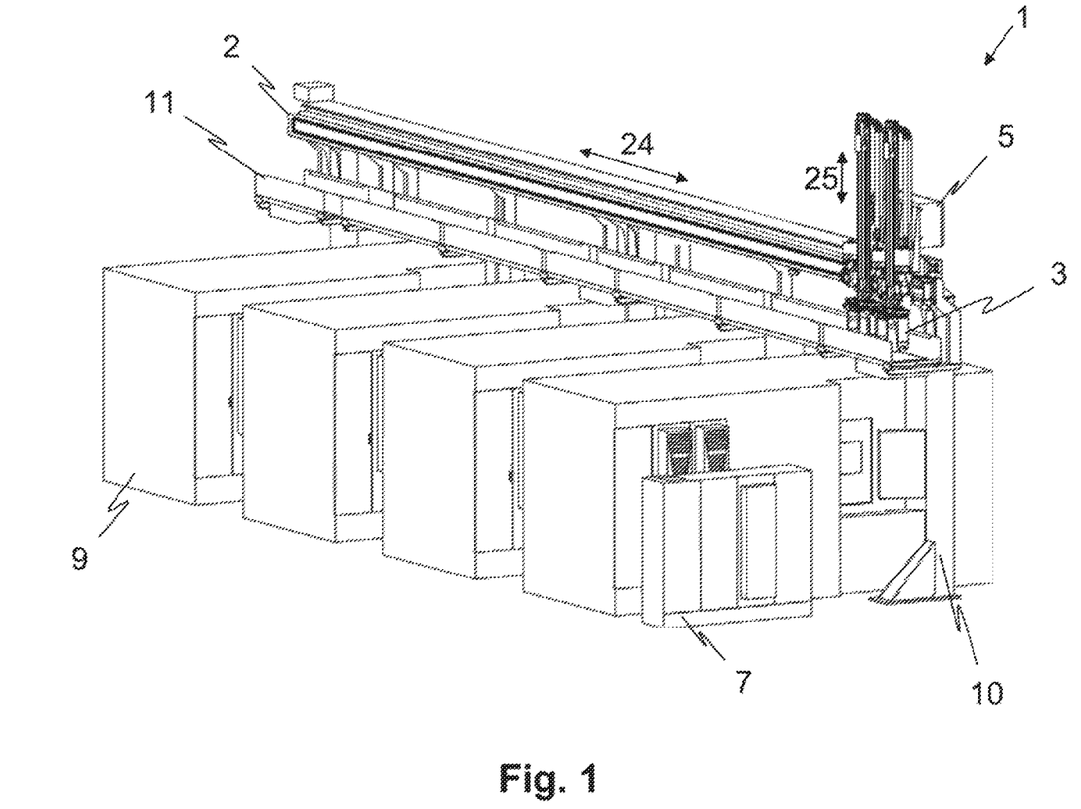
FIG. 1 shows the basic design of the embodiments of a gantry loader in accordance with the present disclosure in a perspective view.

FIG. 1 shows the basic design of the embodiments of the gantry loader in accordance with the present disclosure. The following explanations therefore also apply in the same manner to the specific embodiments shown in FIGS. 2 to 7.

The embodiment of the gantry loader has a horizontally extending guide rail 2 at which a carriage 1 is travelable. The guide rail 2 is supported by a support 10 and extends beyond a plurality of stations 9 of a manufacturing system.

The stations 9 of the manufacturing system can be machine tools and/or a feed device and/or removal device for workpieces.

At least one vertically travelable component 25 that carries at least one gripper 3 is provided at the carriage 1. Workpieces can be removed from above from a station of the manufacturing system via these components, can be traveled to the next station by traveling the carriage 1 along the guide rail 2, and can there in turn be fed to the station from above. The gripper or grippers 3 can either directly grip one or more workpieces or can grip a workpiece holder such as a pallet.

Figure 7:
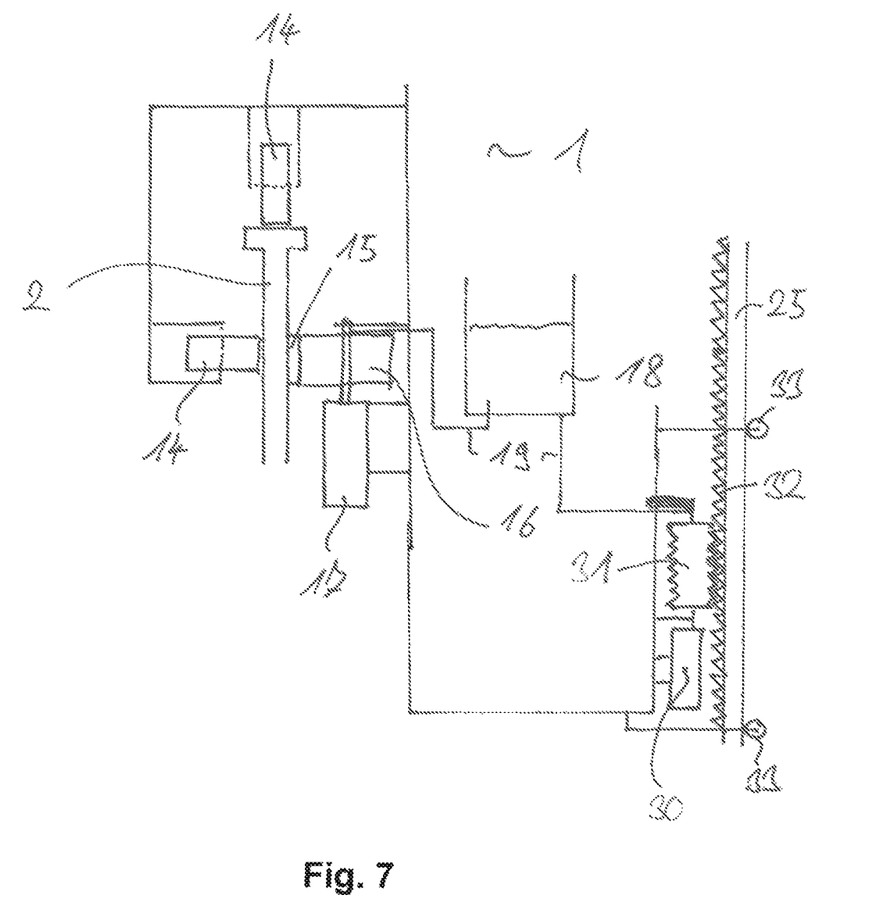
FIG. 7 schematically shows elements of an embodiment of a gantry loader.

As shown schematically in FIG. 7, the carriage 1 has at least one drive 17 via which the carriage is travelable along the guide rail 2. In the embodiment, the guide rail 2 has a toothed rack 15 which meshes with a drive element 16 of the carriage 1. The drive element 16 can be a pinon and/or a worm, for example. The drive element 16 is driven by the at least one drive 17 of the carriage 1. The carriage 1 further has guide rollers 14 providing horizontal and vertical support of the carriage on the guide rail 2.

The carriage furthermore has at least one drive via which the vertically travelable component 25 is travelable.

The carriage 1 typically has still further drives, in particular for actuating the gripper 3 and/or for moving the gripper 3 relative to the carriage and/or relative to the vertically travelable component 25.

In the embodiment, the vertically travelable component 25 is formed by a linear axle that has a drive 30 via which it can be vertically driven. A toothed rack 32 can, for example, be provided that meshes with a drive element 31 of the carriage, such that the component 25 is hereby vertically travelable at the carriage. Further, guide rollers 33 for the component 25 may be provided.

In the embodiment shown in FIG. 1, the carriage 1 is designed as a so-called H configuration in which two vertical linear axles 25 are coupled to one another and are traveled in parallel. Such a design is in particular of advantage for the transport of long workpieces.

Alternatively, a robot arm having a plurality of pivot axles and/or rotational axles can also be used as the vertically travelable component. A six-axis industrial robot can, for example, be arranged at the carriage, for example hanging or laterally at the carriage.

In the embodiment, the gantry loader furthermore has a safety pan and/or oil pan 11 that is arranged beneath the carriage 1. The safety pan and/or oil pan 11 extends along the travel path of the workpieces and has openings in the region of the stations 9 of the manufacturing system via which the workpieces can be removed from the respective station or can be transferred to the respective stations. The other regions of the manufacturing system are hereby protected from falling workpieces and/or from dripping oil. Such a safety pan and/or oil pan is optional.

The gantry loader and/or manufacturing system has a control cabinet 7 in which the control 6 for the gantry loader is arranged. The control of the gantry loader permits a synchronous control of the gantry loader and of the stations of the manufacturing system.

In accordance with the present disclosure, the carriage 1 has an energy store 5 which serves the energy supply of at least one drive of the carriage. The energy store can either serve to support an energy supply of the carriage or can be configured so that the carriage is supplied at least intermittently with energy completely via the energy store.

In the embodiment, the schematically shown control 4 of the carriage 1 is configured such that an energy recovery is possible from the movement of the carriage or from the movement of a component of the carriage. The recovered energy is then stored in the energy store 5 and is thus available again for operating the carriage.

On the one hand, braking energy that is acquired on the deceleration of the carriage and/or from components of the carriage can be stored here. Alternatively or additionally, the potential energy that becomes free on the lowering of a component of the carriage in the vertical direction can also be recovered and stored. The energy that becomes free on the lowering of the vertically travelable component 25 can in particular be recovered and stored.

The drive of the carriage or of the component can simultaneously be used as a generator and can therefore be used for the drive or for the recovery of energy depending on the operating phase. The control 4 of the carriage can in particular be correspondingly configured.

The drive in the embodiment is an electric drive. The energy store is an electrical energy store. A supercap and/or a rechargeable battery can in particular be used as the electrical energy store. The electric drive can be an electric motor and/or an electrical linear axle. The drive of the carriage and of all of its components takes place electrically. Hydraulic units and/or pneumatic units can hereby be dispensed with.

The carriage 1 in the embodiment is furthermore equipped with its own lubricant system that comprises a lubricant tank 18. No more external lubricant feed lines are hereby required. The drive elements 16 and 31 may be provided with lubricant from the lubricant tank 18 by lubricant lines 19.

The gantry loader in the embodiment furthermore has a contactlessly working energy supply for the carriage. The energy supply can be used to charge the energy store 5 and/or for the energy supply of one or more drives of the carriage. The contactlessly working energy supply makes use of induction. The gantry loader can in particular have one or more induction coils that cooperate with one or more induction consumers at the carriage to supply the carriage with energy.

The use of a contactless energy supply has the advantage that the previously required supply chain for supplying the carriage 1 can be dispensed with. A considerably higher flexibility in the design and in particular in the extension of the gantry loader is hereby achieved. The supply chain is furthermore a wear part which can now be dispensed with.

The energy store 5 of the carriage has the advantage that the energy supply of the gantry loader no longer has to be configured to also be able to cover consumption peaks in the operation of the carriage since the energy store 5 at least accommodates such consumption peaks. It is this that makes the use of a contactless energy supply practical since the energy supply does not have to be configured for peak loads.

The solution in accordance with the present disclosure furthermore in principle permits the use of as many carriages as desired at a gantry loader, i.e. at a guide rail, since a correspondingly high number of supply chains no longer has to be supplied. In addition, individual carriages can, for example, be removed and replaced without problem for servicing, for example. Only the mechanical connection to the guide rail 2 has to be released or reestablished for this purpose.

The control 4 of the carriage 1 comprises at least the power electronics for one or more drives of the carriage 1.

In a first variant, the power electronics arranged at the carriage are controlled via the control 6 of the gantry loader. In this case, a transmission of the positional data and/or speed data takes place from the carriage to the control 6 of the gantry loader so that the position regulation and/or speed regulation takes place in the control 6 of the gantry loader.

In a second variant, the speed regulation and/or position regulation can take place by the control 4 of the carriage itself. The control 4 can here evaluate positional data and/or speed date and can compare them with a desired value to regulate the drive or drives to the desired value.

The desired values can be transmitted from the control 6 of the gantry loader to the control of the carriage or can already be stored in the control of the carriage.

The communication between the carriage and the control 6 of the gantry loader likewise takes place contactlessly in the embodiment.

Different variants of the energy supply of the carriage and of the communication between the carriage and the control 6 of the gantry loader will be described in more detail in the following with reference to the specific embodiments in FIG. 2 to FIG. 4.

Figure 2:
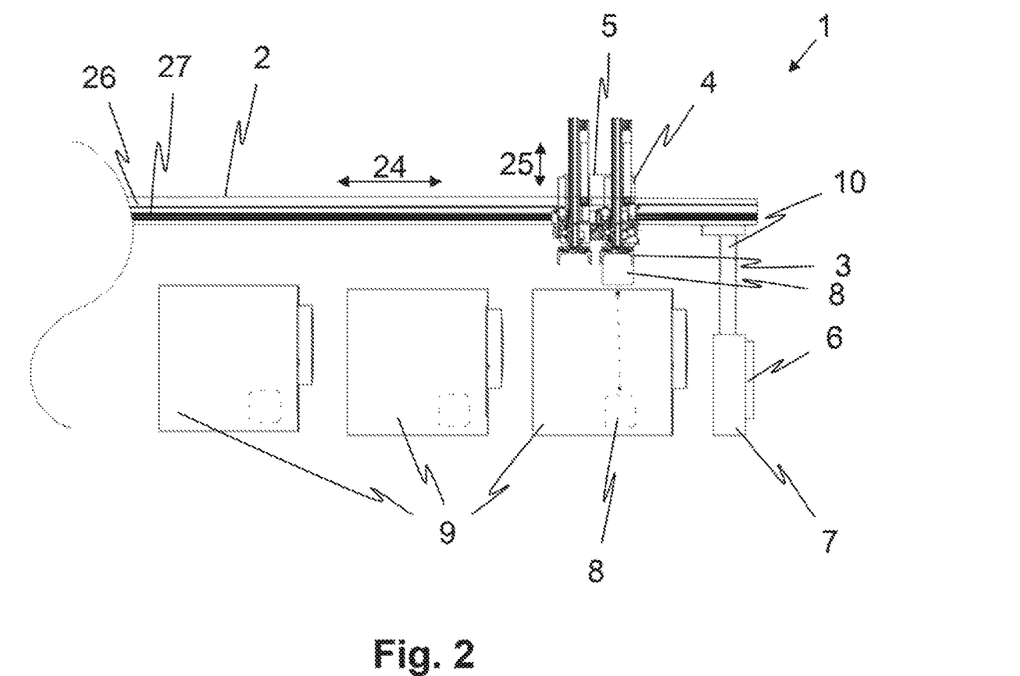
FIG. 2 shows a first specific embodiment of a gantry loader in accordance with the present disclosure in a side view.

In a first embodiment of the present disclosure that is shown in more detail in FIG. 2, the carriage 1 is supplied with energy in every travel position via the energy supply of the gantry loader. An induction rail 26 is provided for this purpose that extends over the total travel path of the carriage along the guide rail 2. The induction rail 27 can be arranged at the guide rail 2 or at a separate support rail. The induction rail comprises at least one induction loop that cooperates with an induction consumer of the carriage.

In this embodiment, the energy store 5 of the carriage serves the cushioning of power peaks and therefore the supplementation of the constantly present energy supply by the gantry loader.

The first embodiment shown in FIG. 2 furthermore comprises a cableless data transmission system that provides a data transmission link between the carriage and the control 6 of the gantry loader in every travel position of the carriage. A data transmission rail 26 can in particular be provided that extends over the total length of the guide rail 2 and cooperates with an antenna at the carriage 1. The data transmission rail 26 can be arranged at the guide rail 2 or can be supported via a separate support rail.

Figure 6:
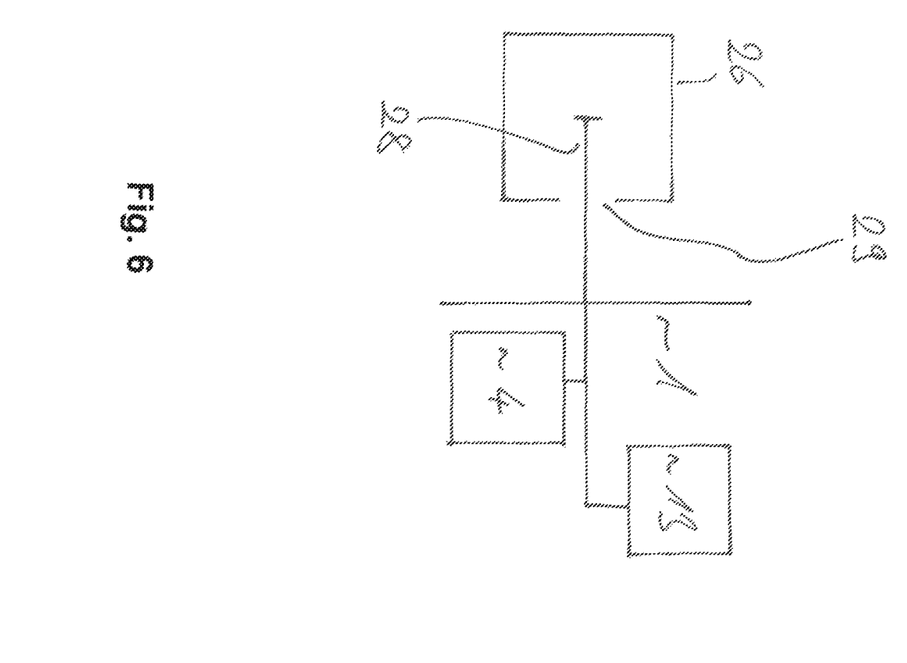
FIG. 6 shows an embodiment of a communication system in a side cut.

A slit hollow conductor can be used as the data transmission rail 26, such as the embodiment shown in FIG. 6. The antenna 28 of the carriage reaching via the slit 29 into the hollow conductor. A secure data transmission is hereby ensured in every travel position. Such a data transmission line can furthermore also be designed as redundant in that different modes of the hollow conductor are used for the data transmission. A side cut of the data transmission rail 26 and the antenna 28 extending into a slit 29 of the data transmission rail 26 is shown in FIG. 6. The antenna 28 is connected to the control 4 of the carriage 1 and a sensor 13 of the carriage 1.

Figure 3:
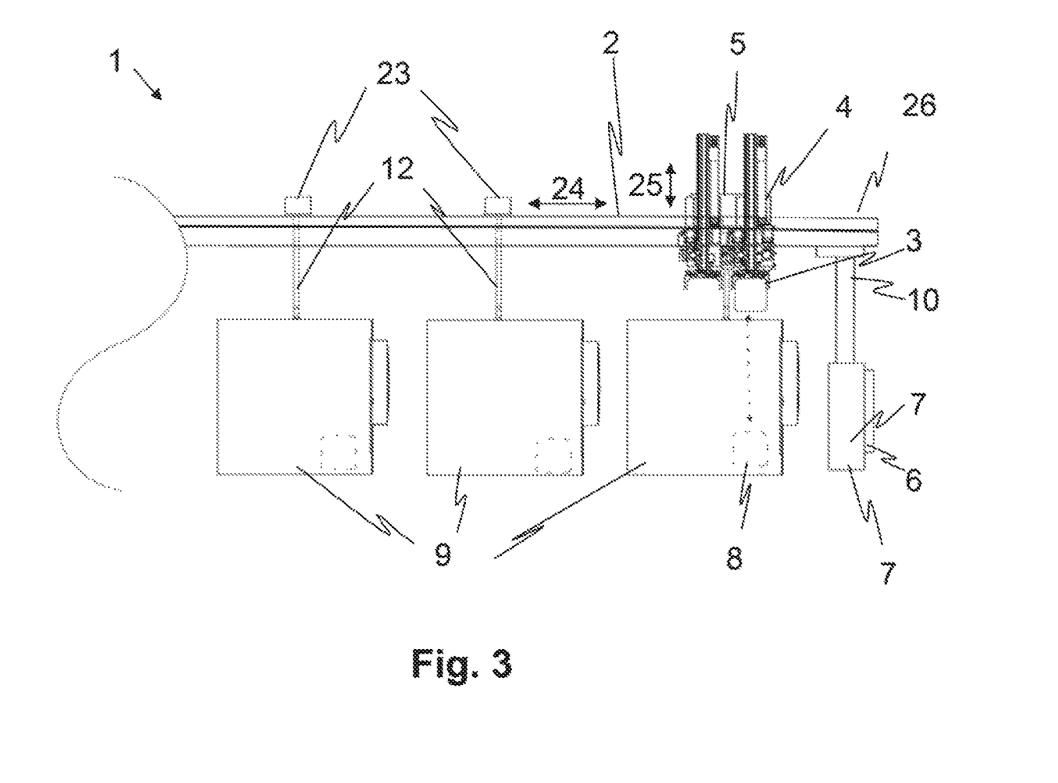
FIG. 3 shows a second specific embodiment of a gantry loader in accordance with the present disclosure in a side view.
Figure 4:
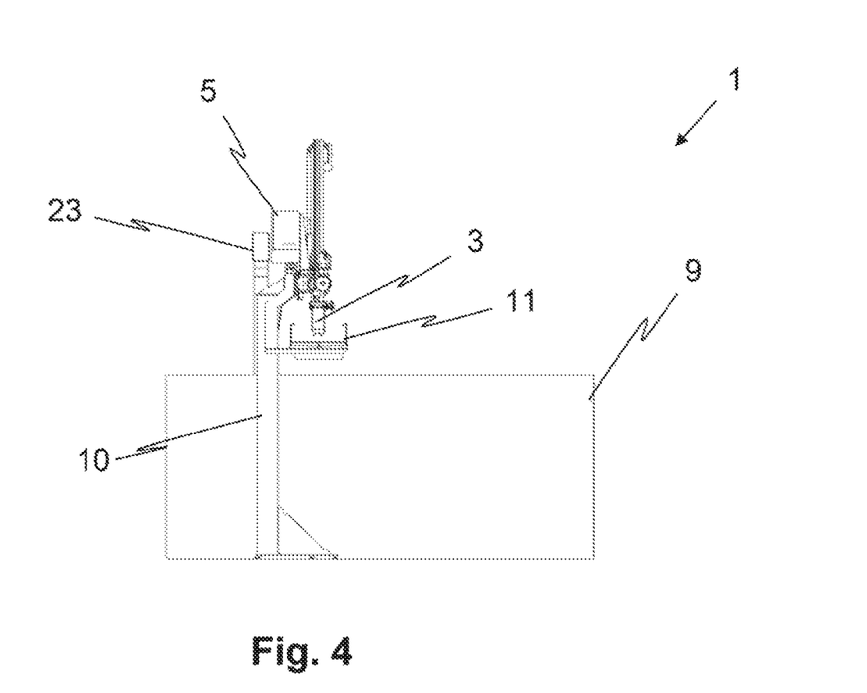
FIG. 4 shows the second embodiment shown in FIG. 3 in a frontal view along the extent of the guide rail.

In the second embodiment shown in FIGS. 3 and 4, the same data transmission system is provided as in the first embodiment shown in FIG. 2.

An energy supply of the carriage in the second embodiment shown in FIGS. 3 and 4 is in contrast provided in specific travel positions and/or travel sections and not provided in other specific travel positions and/or travel sections. Charge units 23 are provided for this purpose that permit an energy supply of the carriage 1 at specific travel positions and/or in specific travel sections. The charge units comprise one or more induction coils that cooperate with one or more induction consumers of the carriage. However, unlike in the embodiment shown in FIG. 2, they no longer extend along the total travel path of the carriage, but are rather provided at points and/or section-wise there.

As can be seen from FIGS. 3 and 4, the charge units 23 in the embodiment are each provided in a work position of the carriage 1 above a station 9 of the production system. The carriage stops in such work positions to pick up or place down workpieces 8. The charge unit 23 can be utilized during this dwell time to charge the energy store 5 of the carriage. It is dimensioned such that it permits a travel of the carriage from at least one station to the next station without an external energy supply.

The arrangement of the charge units in the work positions has the further advantage that here energy is required for the raising of the workpiece and for the acceleration of the carriage from a standing start so that the charge unit can additionally be used to support the energy store.

The charge units in a first variant, not shown, can be mechanically fastened to the guide rail 2 and/or can be supplied with current via a line extending along the guide rail 2.

In the variant shown in FIGS. 3 and 4, the charge units 23 are in contrast supplied with current electrically via the respective station 9. The mechanical arrangement of the charge units 23 furthermore also respectively takes place at a separate holder 12 that is fastened to the floor or to the respective station 9 and supports the charge unit 23. Alternatively, the mechanical arrangement can, however, also take place at the guide rail 2 here.

Figure 5:
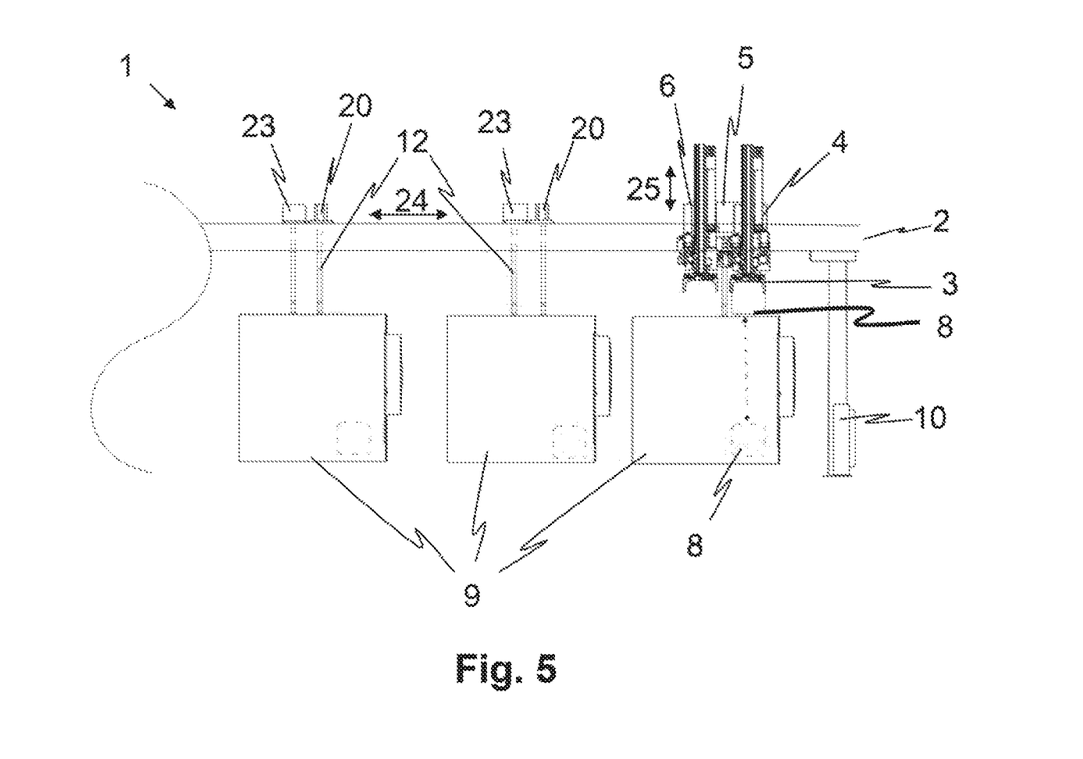
FIG. 5 shows a third specific embodiment of a gantry loader in accordance with the present disclosure in a side view.

In the third embodiment shown in FIG. 5, the data transmission also takes place only at points or section-wise. For this purpose, at least one data transmission unit 20 is provided that permits communication with the carriage in specific travel positions and/or in a specific travel section. It is a point-to-point signal exchange in this respect such as industrial Bluetooth.

In the embodiment, the data transmission units are each arranged at a work position of the carriage 1 above a station 9 of the production system. The data transmission units 20 in the embodiment are furthermore held mechanically via a holder 12 and are electrically coupled to a station 9. The same configurations and alternatives can be used for the mechanical and electrical connection for the data transmission units 20 as for the above-described charge units 23 in accordance with the embodiment in FIGS. 3 and 4.

If data transmission at points is used, a control 4 of the carriage 1 should be used that enables an autonomous travel of the carriage at least at times. The control 4 of the carriage has at least one position regulation and/or speed regulation of its own for the carriage and/or its components.

In the embodiment, the gantry loader is configured as a linear gantry so that the guide rail 2 is arranged in a stationary manner at the floor via the support 10.

The present disclosure can also be used in the same way at an area gantry in which the guide rail 2 can be traveled horizontally perpendicular to its extent. This can take place either via a travelable support 10 or in that the guide rail 2 is travelably arranged at the support 10.

REFERENCE NUMERAL LIST

1 carriage
2 guide rail
3 gripper
4 control of the carriage
5 energy store
6 control of the gantry loader
7 control cabinet
8 workpiece
9 machine tool
10 support
11 safety pan/oil pan
12 power supply of the charge unit at the guide path
13 sensor
14 guide roller
15 toothed rack
16 drive element
17 drive
18 lubricant tank
19 lubricant line
20 data transmission unit (point-to-point signal exchange)
23 charge unit
24 X axis (direction of movement of the carriage at the guide rail)
25 Z axis (direction of movement vertically)
26 data transmission rail (cableless signal transmission)
27 induction rail
28 antenna
29 slit
30 drive
31 drive element
32 toothed rack
33 guide roller

The invention claimed is:

1. A gantry loader configured for transport of a workpiece between stations of a production system, comprising:
   a horizontal guide rail; and
   a carriage being travelable at the horizontal guide rail and having at least one drive;
   wherein the carriage has:
      an energy store configured to supply energy to the at least one drive;
      a gripper for gripping the workpiece; and
      a component that is at least also movable in a vertical direction, the gripper being mechanically supported by the component such that the gripper and the workpiece gripped by the gripper are moved in the vertical direction by a corresponding movement of the component; and
   wherein the gantry loader has an energy supply device contactlessly supplying the energy store in the carriage with electrical energy through one or more induction coils contactlessly transmitting electrical power to the energy store.

2. The gantry loader in accordance with claim 1, wherein the gantry loader is a linear gantry or an area gantry and wherein the horizontal guide rail is supported via one or more supports.

3. The gantry loader of claim 1, wherein the energy store is replaceable, and a change station is provided for replacement of the energy store.

4. The gantry loader of claim 1, wherein a control of the carriage transmits status data to a control of the gantry loader.

5. The gantry loader in accordance with claim 1, wherein the energy supply device supplies the carriage with energy permanently or in every travel position, an energy supply section of the energy supply device extending over a total length of the horizontal guide rail.

6. The gantry loader in accordance with claim 1, wherein the energy supply device supplies the carriage with energy intermittently or in travel sections, using energy supply sections arranged in a plurality of travel positions or travel sections.

7. The gantry loader in accordance with claim 6, wherein the energy supply device supplies the carriage with energy in at least one work position above a station of a manufacturing system, the at least one work position being used by the carriage to place down or pick up the workpiece and for charging; or wherein the energy supply device supplies the carriage with energy in at least one parking position, the carriage being traveled into the at least one parking position for charging by a control depending on a charge status or at predefined points in time in a charge cycle.

8. The gantry loader in accordance with claim 1, wherein the energy supply device is dimensioned such that a peak power provided by the energy supply device is lower than a maximum power consumption of the carriage.

9. The gantry loader in accordance with claim 1, wherein the carriage is operable at least at times only via the energy of the energy store.

10. The gantry loader in accordance with claim 1, having a cableless data transmission system for communication with the carriage, wherein the data transmission system has a slit hollow conductor that extends along the horizontal guide rail and cooperates with an antenna arranged at the carriage.

11. The gantry loader in accordance with claim 1, wherein the carriage has a control for the at least one drive receiving commands or synchronization data from a control of the gantry loader, the at least one drive being controlled by the control of the carriage by feedback control.

12. The gantry loader in accordance with claim 1, wherein the carriage has an autonomous lubrication system having a lubricant container for a supply of at least one mechanical axle or at the least one drive with a lubricant.

13. The gantry loader in accordance with claim 1, wherein the at least one drive is configured for traveling the component that is at least also movable in the vertical direction.

14. The gantry loader in accordance with claim 13, wherein the component that is at least also movable in the vertical direction comprises a vertically movable toothed rack driven via the at least one drive or a robot arm having at least one rotational axis driven by the at least one drive.

15. The gantry loader in accordance with claim 1, further comprising two or more carriages that are movable along the horizontal guide rail, wherein the carriage is included in the two or more carriages.

16. The gantry loader in accordance with claim 1, wherein the at least one drive is configured for traveling the carriage along the horizontal guide rail.

17. The gantry loader in accordance with claim 1, wherein the carriage comprises a first drive configured for traveling the carriage along the horizontal guide rail and a second drive for traveling the component that is at least also movable in the vertical direction and wherein the energy store is configured to supply energy to the first and second drives.

18. The gantry loader in accordance with claim 16, wherein the at least one drive is configured to drive a drive element of the carriage that meshes with a toothed rack of the horizontal guide rail.

\* \* \* \* \*